United States Patent
Hassan-Ali (10) Patent No.: US 12,444,952 B2
(45) Date of Patent: Oct. 14, 2025

(54) SWITCHED CAPACITOR BASED DC OPTIMIZER FOR PV MODULE LEVEL ENERGY HARVESTING

(71) Applicant: HANWHA SOLUTIONS CORPORATION, Seoul (KR)

(72) Inventor: Mudhafar Hassan-Ali, Menlo Park, CA (US)

(73) Assignee: Hanwha Solutions Corporation, Seoul (KR)

( * ) Notice: Subject to any disclaimer, the term of this patent is extended or adjusted under 35 U.S.C. 154(b) by 78 days.

(21) Appl. No.: 18/492,071

(22) Filed: Oct. 23, 2023

(65) Prior Publication Data
US 2025/0132570 A1    Apr. 24, 2025

(51) Int. Cl.
*H02J 3/38* (2006.01)
*H02M 3/07* (2006.01)

(52) U.S. Cl.
CPC .............. *H02J 3/381* (2013.01); *H02M 3/07* (2013.01); *H02J 2300/24* (2020.01)

(58) Field of Classification Search
CPC ........................................................ H02J 3/381
USPC ........................................................... 307/82
See application file for complete search history.

(56) References Cited

U.S. PATENT DOCUMENTS

| | | | |
|---|---|---|---|
| 7,986,122 B2 * | 7/2011 | Fornage | H02J 3/46 320/101 |
| 11,350,186 B2 * | 5/2022 | Pauletti | G01K 1/024 |
| 2014/0167513 A1 | 6/2014 | Chang et al. | |
| 2018/0069504 A1 | 3/2018 | Ham et al. | |
| 2021/0313928 A1 | 10/2021 | Charles et al. | |

FOREIGN PATENT DOCUMENTS

| | | |
|---|---|---|
| JP | 5347043 B1 | 11/2013 |
| JP | 2014-0157996 A | 8/2014 |
| JP | 6935875 B1 | 9/2021 |
| KR | 101385692 B1 | 4/2014 |
| KR | 10-2014-0119277 A | 10/2014 |
| KR | 101926326 B1 | 12/2018 |

OTHER PUBLICATIONS

Inernational Search Report for International Application No. PCT/KR2024/013930 mailed on Dec. 11, 2024.

* cited by examiner

*Primary Examiner* — Joseph Chang
(74) *Attorney, Agent, or Firm* — Harness, Dickey & Pierce, P.L.C.

(57) ABSTRACT

A photovoltaic (PV) system may include a plurality of PV modules connected in series, each PV module of the plurality of PV modules being configured to harvest solar energy, and output the harvested solar energy as direct current (DC); at least one inverter connected to the plurality of PV modules, the at least one inverter configured to, receive the DC output by the plurality of PV modules, and convert the DC output into alternating current (AC); each PV module of the plurality of PV modules includes at least one capacitor configured to store the harvested solar energy; and processing circuitry configured to, monitor a charging voltage of the at least one capacitor, and control the DC output of the PV module based on the monitored charging voltage of the at least one capacitor.

20 Claims, 3 Drawing Sheets

CHARGING CAPACITOR

FIG. 3A

DISCHARGING CAPACITOR

SWITCHED CAPACITOR BASED DC OPTIMIZER FOR PV MODULE LEVEL ENERGY HARVESTING

BACKGROUND

Various example embodiments relate to a switched capacitor-based direct current (DC) optimizer for photovoltaic (PV) module level energy harvesting, systems including the same, and/or methods of operating the same.

Typically, PV systems include an array of PV modules for harvesting PV energy (e.g., solar energy) using PV cells. The PV arrays include a plurality of PV modules connected in a "string" to a central inverter which converts the DC electricity output by the PV modules into alternating current (AC) electricity, or in other words, the plurality of PV modules are connected typically in series with each other and the central inverter. When one or more of the PV modules are affected by external conditions, such as shading, different orientations of the PV modules, damage to the PV module, etc., the amount of PV energy harvested by affected PV module decreases. However, because the plurality of PV modules are connected in series, the unaffected PV modules must also reduce their output electrical current at the same output current (e.g., match the output) as the affected PV module, thereby decreasing the energy harvesting performance of the entire PV array.

SUMMARY

At least one example embodiment is directed to a photovoltaic (PV) system.

In at least one example embodiment, the PV system may include a plurality of PV modules connected in series, each PV module of the plurality of PV modules is configured to, harvest solar energy, and output the harvested solar energy as direct current (DC), at least one inverter connected to the plurality of PV modules, the at least one inverter configured to, receive the DC output by the plurality of PV modules, and convert the DC output into alternating current (AC), each PV module of the plurality of PV modules includes at least one capacitor configured to store the harvested solar energy, and processing circuitry configured to, monitor a charging voltage of the at least one capacitor, and control the DC output of the PV module based on the monitored charging voltage of the at least one capacitor.

At least one example embodiment is directed to a method of operating a photovoltaic (PV) system.

In at least one example embodiment, the method may include monitoring charging voltages of a plurality of capacitors included in a plurality of PV modules, and controlling current output of each PV module of the plurality of PV modules based on the monitored charging voltage corresponding to the PV module.

At least one example embodiment is directed to a module level power electronic (MLPE).

In at least one example embodiment, the MLPE may include at least one capacitor configured to store solar energy harvested by a photovoltaic (PV) module, and processing circuitry configured to, monitor a charging voltage of the at least one capacitor, and control a direct current (DC) output of the PV module based on the monitored charging voltage of the at least one capacitor.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Various example embodiments relate to a switched capacitor-based direct current (DC) optimizer for photovoltaic (PV) module level energy harvesting, systems including the same, and/or methods of operating the same.

In conventional PV systems, DC optimizers (e.g., solar optimizers) may be added to each of the PV modules of a PV system such that the decreased energy harvesting performance of one or more PV modules does not affect the energy harvesting performance of the unaffected PV modules. More specifically, DC optimizers may perform Maximum Power Point Tracking (MPPT) to track the maximum power being generated by each PV module and regulate the voltage being output by the PV module to an inverter of the PV system. More specifically, conventional DC optimizers implement a power conversion stage consisting of a buck converter, a buck-boost converter, and/or a boost converter, to increase or decrease the output voltage of the individual PV module and thereby improve the amount of electricity being output by the entire PV system.

However, the buck converters, buck-boost converters, and/or boost converters used in conventional DC optimizers require a magnetic inductor and a large number of switches to operate. The inductors used in conventional DC optimizers are physically large components, are relative expensive, and/or have increased rates of failure. Further, the use of inductors in conventional DC optimizers results in decreased energy conversion efficiency due to the current source electrical characteristics of PV modules.

Accordingly, there is a desire for improved DC optimizers which do not use inductors for the power conversion stage. According to at least one example embodiment, a DC optimizer may include a switched capacitor as a replacement for the inductor of conventional DC optimizers, thereby decreasing the expense of DC optimizers, reducing the physical size of DC optimizers, reducing the failure rate of DC optimizers, and/or improving the electrical conversion efficiency of DC optimizers in comparison to conventional, inductor-based DC optimizers. For example, the power efficiency of an inductor-based DC optimizers (e.g., DC optimizers including buck, buck-boost, and/or boost converters) have a general power dissipation, e.g., power loss, of the main passive components (inductors and capacitors) as expressed in the following equation:

$$P_{Losses} = ESR_L \cdot I_{RMS_L}^2 + ESR_C \cdot I_{RMS_C}^2 \quad [\text{Equation 1}]$$

where $ESR_L$ is the "equivalent series resistance" for the inductor of the buck, buck-boost and/or boost converter, $I_{RMS_L}$ is the root mean square (RMS) current flowing in the inductor L, $ESR_C$ is the "equivalent series resistance" for the bulk capacitor C, and $I_{RMS_C}$ is the RMS current flowing in the bulk capacitor C.

Conversely, the general power dissipation of a switch capacitor converter may be expressed using the following equation:

$$P_{Losses} = ESR_C \cdot I_{RMS_C}^2 \quad [\text{Equation 2}]$$

Consequently, the power efficiency of the switch capacitor DC optimizer is improved over the power efficiency of the inductor-based DC optimizer.

Furthermore, the reliability of a switch capacitor based DC optimizer will improve when the number of parts, especially the critical parts like capacitors, inductors and switches, are reduced. In fact, the reliability R may expressed using the following equation:

$$R_{Inductor\ converter} = (1 - F_C) \cdot (1 - F_L) \cdot (1 - F_{SW}) \quad [\text{Equation 3}]$$

where $F_x$ is the Failure rate (probability of failure is expressed from 0<1), where C stands for the bulk Capacitor, L stands for the inductor, and SW stands for the switch.

On the other hand, the switch capacitor converter reliability may be expressed as:

$$R_{Switch\ capacitor\ converter} = (1 - F_c) \cdot 1 - F_{SW}) \quad [\text{Equation 4}]$$

Hence $$R_{Switch\ capacitor\ converter} > R_{Inductor\ converter}$$

Additionally, it may be concluded that the converter size (e.g., physical size) and cost for the switch capacitor based DC optimizer are also reduced due to the elimination of the inductor.

Figure 1:
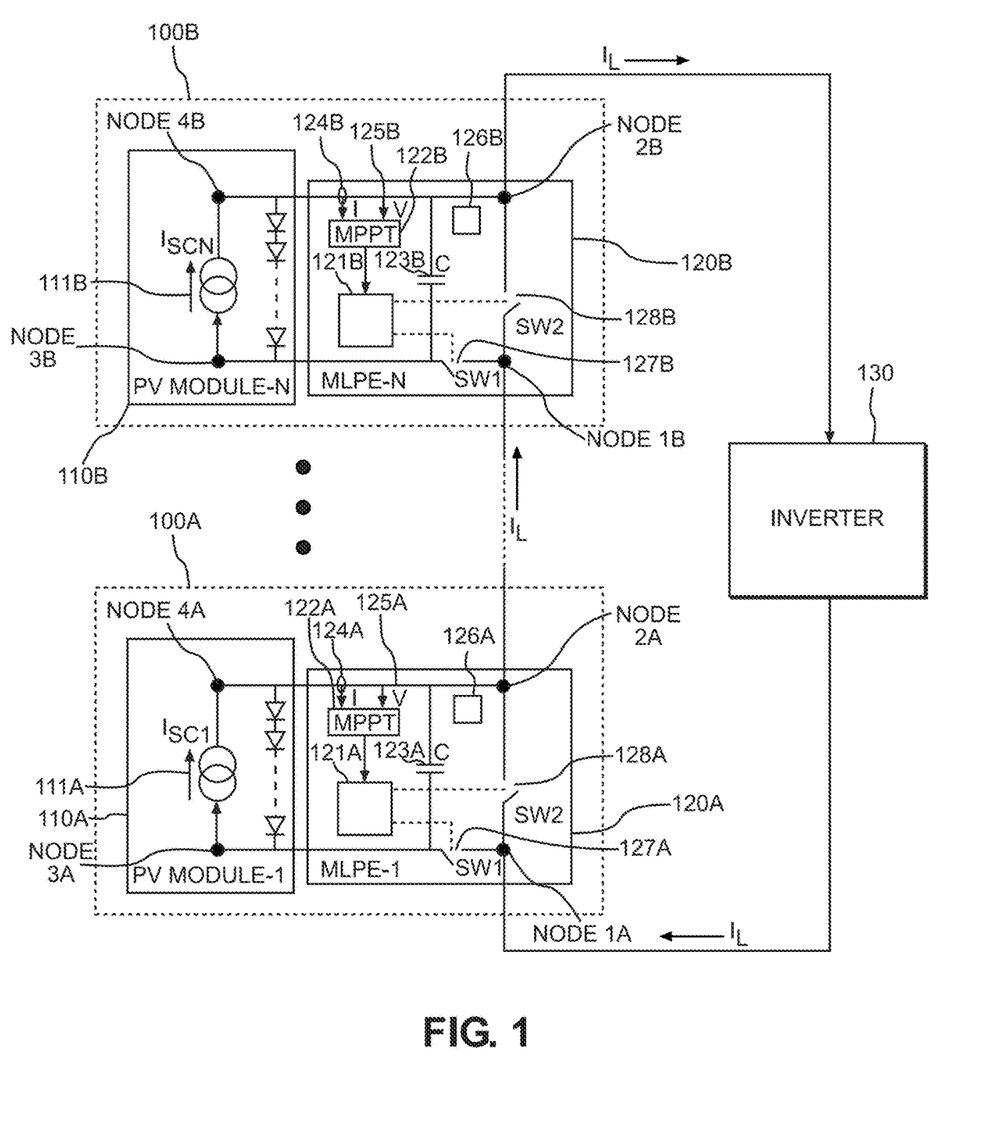
FIG. 1 illustrates an example photovoltaic (PV) system including a plurality of PV generators according to at least one example embodiment.

FIG. 1 illustrates an example photovoltaic (PV) system 1000 including a plurality of PV generators according to at least one example embodiment.

According to at least one example embodiment, the PV system 1000 may include a plurality of PV generators, e.g., PV generators 100A and 100B, etc., connected in series (e.g., connected in a daisy chain) to each other and to an inverter 130 (e.g., central inverter), etc. However, the example embodiments are not limited thereto, and for example, the PV system 1000 may include a greater or lesser number of PV generators 100, a greater number of inverters 130, and/or additional components, such as a battery system, electrical connections to an electrical grid (e.g., public utility grid), etc.

Each of the PV generators, e.g., PV generators 100A and 100B, may include at least one PV module, e.g., PV modules 110A and 110B, and a Module Level Power Electronics (MLPE), e.g., MLPE 120A and 120B, but are not limited thereto, and for example, may further include a communication interface (not shown), power line couplings (not shown), etc. Additionally, the MLPE may be integrated into the corresponding PV module, or the MLPE may be physically separate from the corresponding PV module and may instead be electrically connected to the corresponding PV module. The PV generators 100A and/or 100B may be configured to communicate with one or more external devices (not shown) using the communication interface, such as a computer, a server, a smart device, etc., but are not limited thereto.

According to at least one example embodiment, the PV modules 110A and 110B may include a plurality of PV cells 111A and 111B, respectively, and the plurality of PV cells are configured to harvest PV energy (e.g., solar energy) into DC energy (e.g., DC current, DC power, etc.). For example, in at least one example, the PV cells are configured to operate as electron pumps in response to stimulation from photons. In at least one example embodiment, each of the PV cells may comprise at least one of a photovoltaic crystalline, polycrystalline, amorphous, and/or thin film semiconductor structure, but are not limited thereto. As shown in FIG. 1, the plurality of PV cells 111A and 111B may be electrically modeled as current generators, or in other words, the PV cells 111A and 111B operate as current generators.

Additionally, as shown in FIG. 1, each of the PV modules 110A and 110B may be electrically connected to a corresponding MLPE 120A and 120B, etc. According to at least one example embodiment, the MLPEs 120A and 120B are each configured to perform MPPT at the PV module level. For example, in at least one example embodiment, the MLPEs 120A and 120B may be configured to control and/or adjust the DC current output by the PV modules 110A and 110B to increase and/or maximize the power output based on changes to the power output by the PV modules 110A and 110B, in response to a change in energy harvesting current due to, e.g., time of day, weather conditions, shading and/or contaminate (e.g., dirt, soil, water, smog, and/or the like), etc., on the PV modules 110A and/or 110B, deterioration and/or damage to the PV modules 110A and/or 110B, etc., but the example embodiments are not limited thereto. For example, the MLPEs 120A and 120B may be configured to monitor the current and/or voltage produced by the PV modules 110A and 110B, respectively, and to adjust the current output to the electrical circuit of the PV system 1000 while maintaining the output voltage within a desired voltage range. The control of the output current by the MLPEs will be discussed in greater detail in connection with FIGS. 2 to 4.

Although the example illustrated in FIG. 1 shows the MLPEs 120A and 120B each monitoring a single PV module, the examples are not limited thereto, and, for example, in at least some example embodiments, one or more of the MLPEs 120A and/or 120B, etc., may be configured to monitor and manage each of a plurality of PV modules in, e.g., a PV panel, at least a section of a PV array, and/or the PV array, etc.

The MLPEs 120A and 120B may include processing circuitry 121A and 121B and memory 122A and 122B, respectively. The processing circuitry 121A and 121B may include hardware or hardware circuit including logic circuits; a hardware/software combination such as a processor executing software and/or firmware; or a combination thereof. For example, the processing circuitry more specifically may include (and/or be included in) a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The memory 122A and 122B may include computer-readable program code stored in a non-transitory computer-readable medium. The computer-readable program code may be provided to a variety of computers or processors of other data processing devices. The term "non-transitory," as used herein, is a description of the medium itself (e.g., as tangible, and not a signal) as opposed to a limitation on data storage persistency (e.g., volatile memory vs. non-volatile memory, etc.). For example, the non-transitory computer-readable recording medium may be any tangible medium that can store or include the program in or connected to an instruction execution system, equipment, and/or device, and may include a random access memory (RAM), a read only memory (ROM), and/or a non-volatile mass storage device, such as a disk drive, and/or a solid state drive, etc. The memory 122A and 122B may include, for example, computer readable instructions to be executed by the processing circuitry 121A and 121B, etc. In at least some example embodiments, such computer readable instructions may be loaded from a non-transitory computer-readable storage medium independent of the memory 122A and 122B, using a drive mechanism (not illustrated). For example, the memory 122A and 122B may include various special purpose program code including the computer executable instructions which may cause the MPLEs 120A and 120B to perform one or more of the methods of the example embodiments, such as special purpose program code associated with MPPT operations to be discussed in greater detail in connection with FIGS. 2 to 4, etc.

Additionally, the processing circuitry 121A and 121B are configured to execute processes by retrieving the program code (e.g., the computer readable instructions) and data from the memory 122A and 122B to process them, thereby executing special purpose control and functions of the entire MLPE 120A and 120B. Once the special purpose program instructions are loaded into the processing circuitry 121A and 121B, the processing circuitry 121A and 121B executes the special purpose program instructions, thereby transforming the processing circuitry 121A and 121B into a special purpose processor, for example, a special purpose processor to perform one or more of the methods described below in connection with FIGS. 2 to 4. For example, the memory 122A and/or 122B may receive sensor readings, such as current values output by the PV module from an ammeter (e.g., ammeters 124A and/or 124B), voltage values of a capacitor (e.g., capacitors 123A and/or 123B) from a voltmeter (e.g., voltmeters 125A and/or 125B), temperature values of the MLPE 120A and/or 120B and/or components included in the MLPE 120A and/or 120B from a temperature sensor (e.g., temperature sensors 126A and/or 126B), etc., and the processing circuitry 121A and/or 121B may read the sensor readings from the memory 122A and/or 122B, but the example embodiments are not limited thereto. For example, the temperature of the MLPE 120A and/or processing circuitry 121A of the PV generator 100A, and/or the MLPE 120B and/or processing circuitry 121B of the PV generator 100B may be monitored to determine whether the temperature exceeds a desired temperature threshold value, and in response to the temperature exceeding the desired temperature threshold value, the MLPE 120A/B and/or the processing circuitry 121A/B may be powered down, cooled using at least one cooling device (not shown), etc.

In at least one example embodiment the processing circuitry 121A and 121B and the memory 122A and 122B may be included, e.g., as a printed circuit board assembly (PCBA), a system-on-chip, and/or the like. In other words, the processing circuitry and the memory may be combined into a single component, but the example embodiments are not limited thereto.

In at least one example embodiment, the MLPEs 120A and 120B may further include an MLPE enclosure (not shown) protecting the processing circuitry 121A and 121B, the memory 122A and 122B, etc.

According to some example embodiments, the processing circuitry 121A and 121B may generate one or more control signals to control the opening and closing of a plurality of switches, e.g., first switches 127A and 127B, respectively, and/or second switches 128A, and 128B, respectively, but the example embodiments are not limited thereto, and for example, a greater or lesser number of switches may be used. According to some example embodiments, one or more of the plurality of switches may be solid state switches, e.g., MOSFET switches, SiC switches, GaN switches, etc., diodes, an electro-mechanical relay, or any combinations thereof, but the example embodiments are not limited thereto. For example, one or more of the first switches 127A and 127B may be solid state switches and one or more of the second switches 128A and 128B may be solid state switches, diodes, and/or electro-mechanical relays, but the example embodiments are not limited thereto.

According to at least one example embodiment, at least one capacitor (e.g., capacitors 123A and 123B) may be included in the MLPEs 120A and 120B, respectively, but the example embodiments are not limited thereto. The capacitor 123A may be wired in parallel to the electrical circuit of the PV system 1000 at nodes 1A and node 2A, and the capacitor 123B may be wired in parallel to the electrical circuit of the PV system 1000 at nodes 1B and node 2B for capacitor 123B. Additionally, the capacitor 123A may also be wired in parallel to the PV cell 111A of the PV module 110A at nodes 3A and 4A for capacitor 123A, and the capacitor 123B may also be wired in parallel to the PV cell 111B of the PV module 110B at nodes 3B and 4B for capacitor 123B. The first switches 127A and 127B may be connected between the first nodes 1A and 1B and the capacitors 123A and 123B, respectively. The second switches 128A and 128B may be connected between the first nodes 1A and 1B and the second nodes 2A and 2B.

The processing circuitry 121A and 121B may generate control signals to control the plurality of switches 127A, 127B, 128A, and/or 128B (e.g., opening and/or closing one or more of the plurality of switches) based on a voltage value of at least one capacitor, e.g., capacitors 123A and 123B, included in the PV generators 100A and 100B, respectively. For example, the processing circuitry 121A and 121B may control the plurality of switches 127A, 127B, 128A, and/or 128B such that the voltage level of the capacitors 123A and/or 123B are maintained within a desired voltage range. The capacitors 123A and/or 123B may be maintained within a desired voltage range by disconnecting the corresponding PV generator 100A and/or 100B in response to the capacitor 123A and/or 123B being below the desired voltage range so that the capacitor may be charged using the current harvested by the connected PV module 110A and/or 110B, and connecting the corresponding PV generator 100A and/or 100B in response to the capacitor 123A and/or 123B being above the desired voltage range so that the current stored in the capacitor may be discharged into the electrical circuit of the PV system 1000, or in other words, the current stored in the capacitor may be transmitted to a central inverter 130, etc.

According to at least one example embodiment, the voltage value of the capacitor 123A and 123B may be monitored by monitoring an amount of current, $I_{MPP}$, flowing to the capacitor using an ammeter 124B, and/or directly monitoring the voltage value of the capacitor using a voltmeter 125B, etc., but the example embodiments are not limited thereto.

According to at least one example embodiment, the central inverter 130 is configured to receive the DC current output by each of the PV generators 100A and 100B, etc., and convert the DC current into AC current for residential use, commercial use, transmission to an electrical utility grid, etc., but the example embodiments are not limited thereto. In one or more example embodiments, the central inverter 130 may be omitted and/or the central inverter 130 may be replaced by a plurality of inverters, e.g., microinverters, etc., connected to one or more of the PV generators, etc.

While FIG. 1 illustrates two PV generators included in the PV system 1000, the example embodiments are not limited thereto, and for example, there may be a single PV generator or three or more PV generators, etc.

While certain components of a PV system are shown in FIG. 1, the example embodiments are not limited thereto, and the PV system may include components other than those shown in FIG. 1, which are desired, necessary, and/or beneficial for operation of the underlying PV system and/or electrical system, such as monitoring equipment, communication equipment, energy storage equipment, etc.

Figure 2:
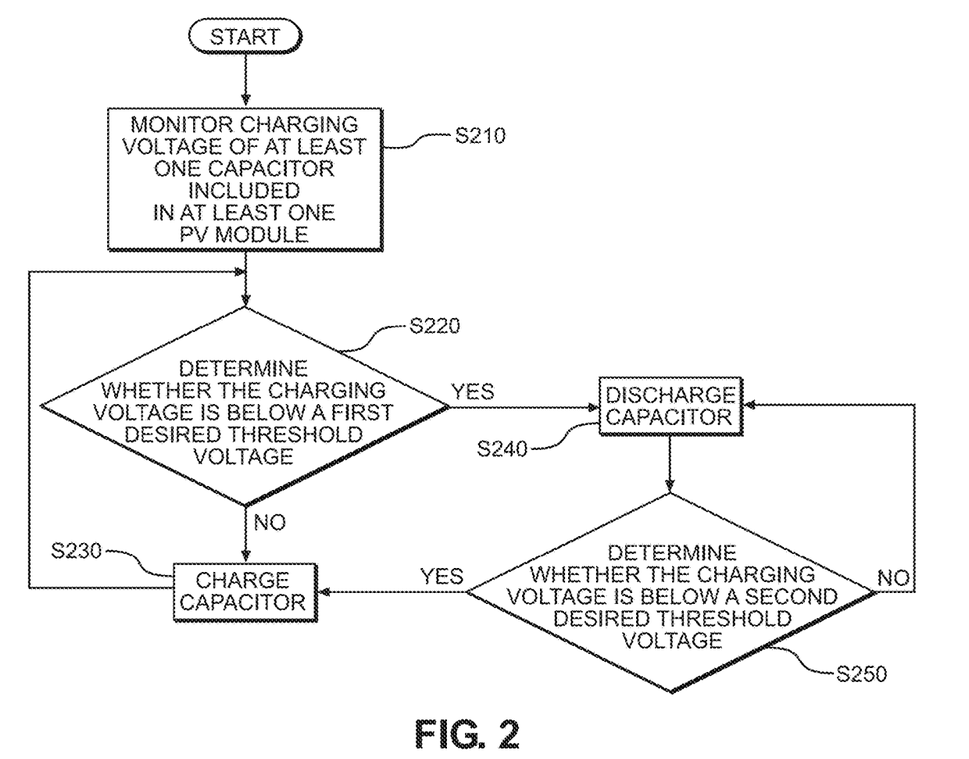
FIG. 2 illustrates an example flowchart of an example PV generator according to at least one example embodiment.
Figure 3A:
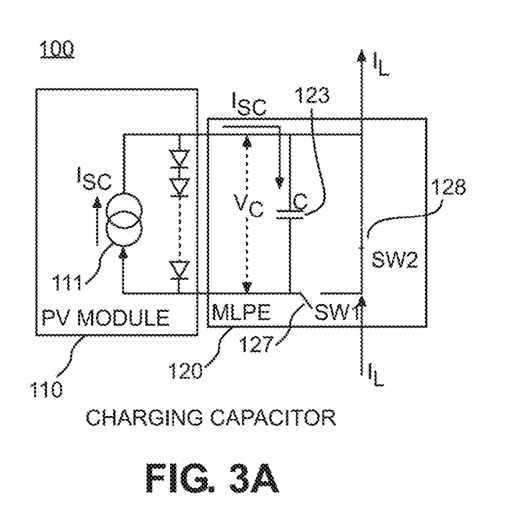
FIG. 3A illustrates an example charging state of an example PV generator according to at least one example embodiment.
Figure 3B:
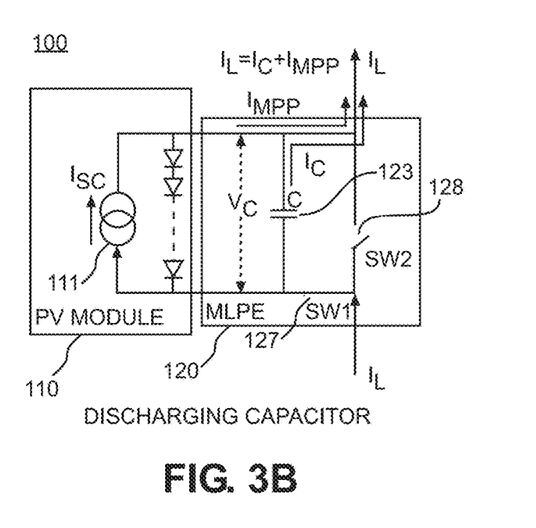
FIG. 3B illustrates an example discharging state of an example PV generator according to at least one example embodiment.
Figure 4:
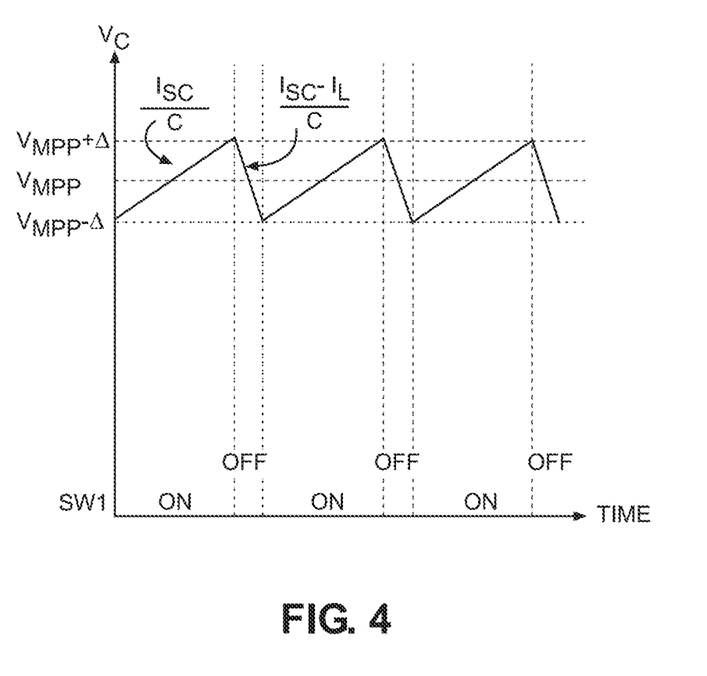
FIG. 4 illustrates an example timing diagram of an example PV generator according to at least one example embodiment.

FIG. 2 illustrates an example flowchart of an example PV generator according to at least one example embodiment. FIG. 3A illustrates an example charging state of an example PV generator according to at least one example embodiment. FIG. 3B illustrates an example discharging state of an example PV generator according to at least one example embodiment. FIG. 4 illustrates an example timing diagram of an example PV generator according to at least one example embodiment. The PV generator 100 of FIGS. 3A and 3B may correspond to either of the PV generators 100A or 100B of FIG. 1, but certain components of the PV generator have been omitted from FIGS. 3A and 3B for clarity of the illustrations, but the example embodiments are not limited thereto.

Referring now to FIGS. 2, 3A, and 3B, according to at least one example embodiment, in operation S210, the processing circuitry (not shown) of the PV generator 100 may monitor a charging voltage of at least one capacitor 123 included in the PV generator 100, but the example embodiments are not limited thereto. For example, the processing circuitry may monitor the charging voltage of the capacitor 123 based on a sensed voltage value, e.g., $V_c$ of FIGS. 3A and 3B, and/or a sensed current value, $I_{sc}$, of FIG. 3A, etc., but the example embodiments are not limited thereto.

In operation S220, the processing circuitry determines whether the charging voltage $V_c$ of the capacitor 123 is within a desired voltage range. According to some example embodiments, the desired voltage range may correspond to a voltage maximum power point ($V_{MPP}$) value+/–a desired ripple voltage value ($\Delta$).

The voltage maximum power point $V_{MPP}$ is the voltage output by the PV module when it is supplying a maximum output power to the load. The current at this voltage is denoted as $I_{MPP}$, hence the maximum output power ($P_{MPP}$) is expressed as:

$$P_{MPP} = V_{MPP} * I_{MPP} \qquad \text{[Equation 5]}$$

Additionally, the $V_{MPP} < V_{OC}$ (module open circuit voltage) and $I_{MPP} < I_{sc}$ (module short circuit current). As such, the desired ripple voltage value ($\Delta$), is set to a small enough value to ensure that the deviation from $V_{MPP}$ results in an acceptable reduction in efficiency ($\delta$, which in practice is kept less than 1%). A formula for relating $\Delta$ to $V_{MPP}$ and the reduction in efficiency may be expressed as:

$$\Delta \leq \frac{\delta \cdot V_{MPP}}{2} \qquad \text{[Equation 6]}$$

For example if $\delta \leq 1\%$ and $V_{MPP}=30V$, the $\Delta \leq 0.15V$ in Equation 6.

Returning to operation S220, the processing circuitry determines whether or not the charging voltage $V_c$ of the capacitor 123 exceeds a first desired voltage threshold, $V_{MPP}+\Delta$ (e.g., an upper limit of the desired voltage range). If the charging voltage $V_c$ of the capacitor 123 does not exceed the first desired voltage threshold, the processing circuitry proceeds to operation S230 and charges the capacitor 123.

For example, as shown in FIG. 3A, the processing circuitry may transmit control signals to the first switch 127 and the second switch 128 to cause the first switch 127 to open and cause the second switch 128 to close in order to charge the capacitor 123. By opening the first switch 127 and closing the second switch 128, the current $I_L$ bypasses the PV generator 100 and continues to the next electrical component of electrical circuit of the PV system 1000, e.g., the next PV generator 100 and/or the central inverter 130, etc. Additionally, because the first switch 127 is open and the loop to the electrical circuit of the PV system 1000 is broken (e.g., an open circuit), the current harvested by the PV cells 111 is $I_{MPP}$ because the PV module is operating at $V_{MPP}$, and is transmitted to the capacitor 123, thereby charging the capacitor 123.

Returning now to FIG. 2, if the processing circuitry determines that the charging voltage $V_c$ of the capacitor 123 exceeds the first desired voltage threshold $V_{MPP}+\Delta$, the processing circuitry proceeds to operation S240 and discharges the capacitor 123.

For example, as shown in FIG. 3B, the processing circuitry may transmit control signals to the first switch 127 and the second switch 128 to cause the first switch 127 to close and cause the second switch 128 to open in order to discharge the capacitor 123. By closing the first switch 127 and opening the second switch 128, the current $I_L$ does not bypass the PV generator 100 as in FIG. 3A, and instead flows to the PV cells 111 and the capacitor 123. Additionally, the current harvested by the PV cells 111, $I_{MPP}$, is combined with the discharging current $I_C$ of the capacitor 123 such that the current being output by the PV generator 100, $I_L=I_C+I_{MPP}$.

In operation S250, the processing circuitry of the PV generator 100 may determine whether the charging voltage $V_c$ of the capacitor 123 has fallen below a second desired voltage threshold $V_{MPP}-\Delta$ (e.g., the lower limit of the desired voltage range). If the charging voltage $V_c$ of the capacitor 123 has not fallen below the second desired voltage threshold $V_{MPP}-\Delta$, the processing circuitry continues to discharge the capacitor 123 (e.g., operation S240). If the charging voltage $V_c$ of the capacitor 123 is below the second desired voltage threshold $V_{MPP}-\Delta$, the processing circuitry starts charging the capacitor 123 again (e.g., operation S230).

As discussed above and shown in FIG. 4, the processing circuitry of the PV generator 100 maintains the charging voltage $V_c$ of the capacitor 123 within a desired voltage range in a linear fashion (e.g., the slope of the charging curve $I_{MPP}/C$ during the charging phase, and the slope of the discharging curve $(I_{MPP}-I_L)/C$ during the discharge phase) by opening or closing the first switch 127 and the second switch 128, thereby maintaining the output current $I_L$ of the PV generator 100 within a desired output current range corresponding to the desired voltage range. Accordingly, if the PV cells 111 of the PV generator 100 harvests less energy due to, for example, shading, etc., the PV generator 100 is bypassed and the output current levels of the other PV generators of the PV system 1000 are not limited by the decreased output current of the PV generator 100. When the capacitor 123 of the PV generator 100 stores enough charge such that the output current $I_L$ is within the desired output current range, the PV generator 100 outputs its output current $I_L$ to the central inverter 130, etc. Moreover, because the PV generator 100 of the example embodiments uses capacitors instead of inductors, the energy efficiency of the PV generator 100 is increased, the physical size of the PV generator 100 is decreased, the reliability of the PV generator 100 is increased, and/or the cost of the PV generator 100 is reduced.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A photovoltaic (PV) system comprising:
    a plurality of PV modules connected in series, each PV module of the plurality of PV modules is configured to,
        harvest solar energy, and
        output the harvested solar energy as direct current (DC);
    at least one inverter connected to the plurality of PV modules, the at least one inverter configured to,
        receive the DC output by the plurality of PV modules, and
        convert the DC output into alternating current (AC);
    each PV module of the plurality of PV modules includes at least one capacitor configured to store the harvested solar energy and at least one switch, the at least one switch is configured to form a first path through a PV cell of the PV module or a second path bypassing the PV cell, for an input current to the PV module; and
    processing circuitry configured to,
        monitor a charging voltage of the at least one capacitor, and
        control the DC output of the PV module by controlling the at least one switch based on the monitored charging voltage of the at least one capacitor.

2. The PV system of claim 1, wherein the processing circuitry is further configured to control the DC output of the PV module by:
    determining whether the charging voltage reaches a first desired threshold voltage; and
    controlling discharging of the at least one capacitor based on results of the determining.

3. The PV system of claim 2, wherein
    the at least one switch includes a first switch and a second switch; and
    the processing circuitry is further configured to,
        close the first switch connected to the at least one capacitor and open the second switch connected to a next PV module or the at least one inverter based on the charging voltage reaching the first desired threshold voltage.

4. The PV system of claim 2, wherein the first desired threshold voltage is a sum of a maximum power point (MPP) voltage of the PV module and a desired ripple voltage.

5. The PV system of claim 2, wherein the processing circuitry is further configured to control the DC output of the PV module by:
    determining whether the charging voltage reaches a second desired threshold voltage; and
    controlling charging of the at least one capacitor based on results of the determining.

6. The PV system of claim 5, wherein
    the at least one switch includes a first switch and a second switch; and
    the processing circuitry is further configured to,
        open the first switch connected to the at least one capacitor and close the second switch connected to a next PV module or the at least one inverter based on the charging voltage reaching the second desired threshold voltage.

7. The PV system of claim 5, wherein the second desired threshold voltage is a difference of a MPP voltage of the PV module and a desired ripple voltage.

8. The PV system of claim 6, wherein the first switch is a solid state switch.

9. The PV system of claim 6, wherein the second switch is at least one of:
    a diode;
    a solid state switch;
    an electro-mechanical relay; or
    any combinations thereof.

10. The PV system of claim 1, wherein each PV module further includes:
    a module level power electronic (MLPE), the MLPE including the processing circuitry; and
    at least one sensor, the at least one sensor including at least one of,
        a voltmeter configured to measure a voltage drop of the at least one capacitor;
        an ammeter configured to measure a current output by at least one solar panel to the at least one capacitor;
        a temperature sensor configured to measure a temperature associated with MLPE included in the respective PV module;
        or any combinations thereof.

11. The PV system of claim 10, wherein the processing circuitry is further configured to:
    monitor the charging voltage of the at least one capacitor using the at least one sensor.

12. A method of operating a photovoltaic (PV) system, the method comprising:
    monitoring charging voltages of a plurality of capacitors included in a plurality of PV modules; and
    controlling current output of each PV module of the plurality of PV modules based on the monitored charging voltage corresponding to the PV module, the controlling including controlling at least one switch to form a first path through a PV cell of the PV module or form a second path bypassing the PV cell, for an input current to the PV module.

13. The method of claim 12, wherein the controlling the current output of each PV module includes:
   determining whether the charging voltage reaches a first desired threshold voltage; and
   controlling discharging of the capacitor included in the respective PV module based on results of the determining.

14. The method of claim 13, wherein
the at least one switch includes a first switch and a second switch; and
the method further comprises,
   in response to the charging voltage reaching the first desired threshold voltage,
      closing the first switch connected to the capacitor included in the respective PV module, and
      opening the second switch, the second switch connected to a next PV module of the plurality of PV modules or connected to at least one inverter connected to the plurality of PV modules.

15. The method of claim 13, wherein the first desired threshold voltage is a sum of a maximum power point (MPP) voltage of the respective PV module and a desired ripple voltage.

16. The method of claim 13, wherein the controlling the current output of each PV module further includes:
   determining whether the charging voltage reaches a second desired threshold voltage; and
   controlling charging of the capacitor included in the respective PV module based on results of the determining.

17. The method of claim 16, wherein
the at least one switch includes a first switch and a second switch; and
the method further comprises,
   in response to the charging voltage reaching the second desired threshold voltage,
      opening the first switch connected to the capacitor included in the respective PV module, and
      closing the second switch, the second switch connected to a next PV module of the plurality of PV modules or connected to at least one inverter connected to the plurality of PV modules.

18. The method of claim 16, wherein the second desired threshold voltage is a difference of a MPP voltage of the respective PV module and a desired ripple voltage.

19. The method of claim 12, wherein
each PV module further includes,
a module level power electronic (MLPE); and
at least one sensor, the at least one sensor including at least one of,
   a voltmeter configured to measure a voltage drop of the capacitor included in the respective PV module,
   an ammeter configured to measure a current output by at least one solar panel to the capacitor included in the respective PV module,
   a temperature sensor configured to measure a temperature associated with the MLPE included in the respective PV module,
or any combinations thereof; and
the method further includes,
   monitoring the charging voltage of the capacitor of the respective PV module using the at least one sensor.

20. A module level power electronic (MLPE), the MLPE comprising:
   at least one capacitor configured to store solar energy harvested by a photovoltaic (PV) module; and
   processing circuitry configured to,
      monitor a charging voltage of the at least one capacitor, and
      control a direct current (DC) output of the PV module by controlling at least one switch based on the monitored charging voltage of the at least one capacitor, the at least one switch configured to form a first path through a PV cell of the PV module or a second path bypassing the PV cell, for an input current to the PV module.

* * * * *